(12) United States Patent
Kai et al.

(10) Patent No.: US 9,632,240 B2
(45) Date of Patent: Apr. 25, 2017

(54) LIGHTING APPARATUS AND AUTOMOBILE INCLUDING THE SAME

(71) Applicant: PANASONIC INTELLECTUAL PROPERTY MANAGEMENT CO., LTD., Osaka (JP)

(72) Inventors: Makoto Kai, Kyoto (JP); Tomoyuki Ogata, Osaka (JP); Yoshihiko Kanayama, Hyogo (JP); Hiro Aoki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/734,370

(22) Filed: Jun. 9, 2015

(65) Prior Publication Data
US 2015/0362145 A1    Dec. 17, 2015

(30) Foreign Application Priority Data
Jun. 12, 2014   (JP) .................................. 2014-121656

(51) Int. Cl.
*B60Q 1/00*   (2006.01)
*B60Q 1/26*   (2006.01)
(Continued)

(52) U.S. Cl.
CPC ......... *G02B 6/0096* (2013.01); *B60Q 1/0035* (2013.01); *B60Q 1/0052* (2013.01);
(Continued)

(58) Field of Classification Search
CPC . G02B 6/0096; F21S 48/1154; F21S 48/1241; F21S 48/137; F21S 48/328;
(Continued)

(56) References Cited

U.S. PATENT DOCUMENTS 5,685,637 A * 11/1997 Chapman ............... B64D 47/04
                                                      362/228
6,414,801 B1 * 7/2002 Roller .................. B60Q 1/0052
                                                      359/726
(Continued)

FOREIGN PATENT DOCUMENTS

JP      2005-108554       4/2005

OTHER PUBLICATIONS

U.S. Appl. No. 14/706,116 to Kanayama et al., filed May 7, 2015.
(Continued)

*Primary Examiner* — Andrew Coughlin
*Assistant Examiner* — Alexander Garlen
(74) *Attorney, Agent, or Firm* — Greenblum & Bernstein, P.L.C.

(57) ABSTRACT

A lighting apparatus includes a ring-shaped light guide including ring-shaped light entry and light exit faces; and light-emitting devices arranged in a ring at predetermined intervals, at positions opposite the light entry face. The light guide includes collimating portions that collimate light emitted from the light-emitting devices. Each of the collimating portions includes light-reflecting faces for collimating, in the direction of the optical axis of the collimating portion, light emitted from the corresponding light-emitting device. The light-reflecting faces include: an outer reflecting face; an inner reflecting face; a lateral reflecting face; and a large radius reflecting face. A distance from the optical axis to an optical axis-side end portion of at least one of the outer reflecting face, the inner reflecting face, and the lateral reflecting face is less than a distance from the optical axis to an optical axis-side end portion of the large radius reflecting face.

8 Claims, 14 Drawing Sheets

(51) Int. Cl.
  *F21V 8/00* (2006.01)
  *F21S 8/10* (2006.01)
  *B60Q 1/18* (2006.01)
  *F21Y 101/00* (2016.01)

(52) U.S. Cl.
  CPC ............ *B60Q 1/18* (2013.01); *F21S 48/1154* (2013.01); *F21S 48/1241* (2013.01); *F21S 48/137* (2013.01); *F21S 48/328* (2013.01); *B60Q 2400/30* (2013.01); *F21Y 2101/00* (2013.01)

(58) Field of Classification Search
  CPC .. F21S 48/2225; F21S 48/225; F21S 48/2281; B60Q 1/0035; B60Q 1/0052; B60Q 1/18; B60Q 1/04
  See application file for complete search history.

(56) References Cited

U.S. PATENT DOCUMENTS

| | | | |
|---|---|---|---|
| 6,739,738 B1* | 5/2004 | Smith | F21S 48/215 362/235 |
| 7,156,544 B2 | 1/2007 | Ishida | |
| 2005/0068787 A1 | 3/2005 | Ishida | |
| 2013/0051045 A1* | 2/2013 | Kay | B61D 29/00 362/478 |
| 2015/0049504 A1* | 2/2015 | Wu | B60Q 1/04 362/517 |
| 2015/0062894 A1* | 3/2015 | Dennis | B60Q 1/0058 362/235 |

OTHER PUBLICATIONS

U.S. Appl. No. 14/688,194 to Kanayama et al., filed Apr. 16, 2015.
U.S. Appl. No. 14/693,152 to Kanayama et al., filed Apr. 22, 2015.

* cited by examiner

LIGHTING APPARATUS AND AUTOMOBILE INCLUDING THE SAME

CROSS REFERENCE TO RELATED APPLICATION

This application claims the benefit of priority of Japanese Patent Application Number 2014-121656, filed Jun. 12, 2014, the entire content of which is hereby incorporated by reference.

BACKGROUND OF THE INVENTION

1. Field of the Invention

The present disclosure relates to a lighting apparatus and an automobile including the lighting apparatus.

2. Description of the Related Art

Light-emitting devices such as light-emitting diodes (LEDs) are used as head lamps for automobiles.

For example, Patent Literature (PTL) 1 (Japanese Unexamined Patent Application Publication No. 2005-108554) discloses a head lamp in which light distribution is regulated by reflecting light emitted from an LED, using a reflector.

SUMMARY OF THE INVENTION

Meanwhile, in order to reduce vehicular accidents, efforts are being taken to make the presence of one's automobile known to oncoming vehicles and pedestrians by turning ON lighting apparatuses disposed on the front face of the automobile, not only at night but also in the daytime.

Lighting apparatuses used for such a purpose may be a lighting apparatus including a ring-shaped light guide having a light entry face at a back end and a light exit face at a front end; and light-emitting devices arranged in a ring at predetermined intervals on the light entry face-side of the light guide. In addition, the portions of the light entry face the light guide opposite the respective light-emitting devices each include a collimating portion that collimates light emitted from the light-emitting device. Here, the collimating portion is an optical element for regulating light distribution and includes a reflecting face disposed in the outer periphery of the light-emitting device. The collimating portion reflects light emitted from the light-emitting device, toward the light exit face at the front end to increase the amount of light emitted forward from the light exit face.

However, in the above-described lighting apparatus, a large percentage of light is not collimated because the surface area of the reflecting face of the collimating portion cannot be sufficiently enlarged. Therefore, in the above-described lighting apparatus, the amount of light emitted forward from the light exit face is insufficient, and thus visibility from oncoming vehicles, pedestrians, etc. is low.

In view of this, the present disclosure has as an object to provide a lighting apparatus the visibility of which is improved by increasing the amount of light emitted forward.

In order to achieve the aforementioned object, a lighting apparatus according to an aspect of the present invention includes: a light guide having a ring-like shape and including a light entry face and a light exit face each having a ring-like shape; and a plurality of light-emitting devices arranged in a ring at predetermined intervals, at positions opposite the light entry face. Here, the light guide includes a plurality of collimating portions that collimate light emitted from the plurality of light-emitting devices, and each of the plurality of collimating portions includes a plurality of light-reflecting faces for collimating, in a direction of an optical axis of the collimating portion, light emitted obliquely with respect to the optical axis, from a corresponding one of the plurality of light-emitting devices. Furthermore, the plurality of light-reflecting faces include: an outer reflecting face disposed on an outer circumference-side of the light guide with respect to the optical axis; an inner reflecting face disposed on an inner circumference-side of the light guide with respect to the optical axis; a lateral reflecting face disposed in a circumferential direction of the light guide with respect to the optical axis; and a large radius reflecting face disposed in each of a position between the inner reflecting face and the lateral reflecting face and a position between the outer reflecting face and the lateral reflecting face. Furthermore, a distance from the optical axis to an optical axis-side end portion of at least one of the outer reflecting face, the inner reflecting face, and the lateral reflecting face is less than a distance from the optical axis to an optical axis-side end portion of the large radius reflecting face.

The above-described configuration is provides a lighting apparatus the visibility of which is improved by increasing the amount of light emitted forward.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE PREFERRED EMBODIMENT

Hereinafter, an exemplary embodiment of the present invention will be described with reference to the drawings. It should be noted that the subsequently-described exemplary embodiment shows a specific preferred example of the present invention. The numerical values, shapes, materials, structural components, the arrangement and connection of the structural components, etc. shown in the following exemplary embodiment are mere examples, and are not intended to limit the scope of the present invention. Furthermore, among the structural components in the following exemplary embodiment, components not recited in any one of the independent claims which indicate the broadest concepts of the present invention are described as arbitrary structural components.

It should be noted that the respective figures are schematic diagrams and are not necessarily precise illustrations. Furthermore, in the respective figures, substantially identical components are assigned the same reference signs, and overlapping description is omitted or simplified.

Embodiment

[Overall Configuration]

First, an overall configuration of a lighting apparatus according to an embodiment will be described with reference to FIG. 1 to FIG. 3.

Figure 1:
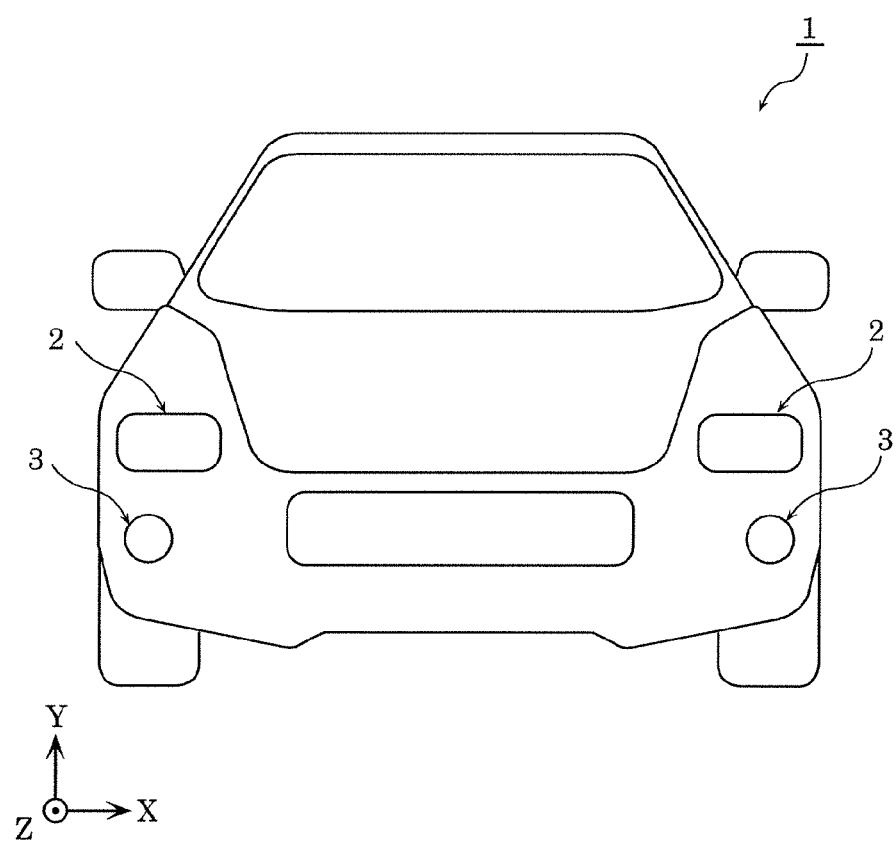
FIG. 1 is a front view of an automobile equipped with lighting apparatuses according to an embodiment.

FIG. 1 is a front view of an automobile equipped with the lighting apparatus according to this embodiment.

Figure 2:
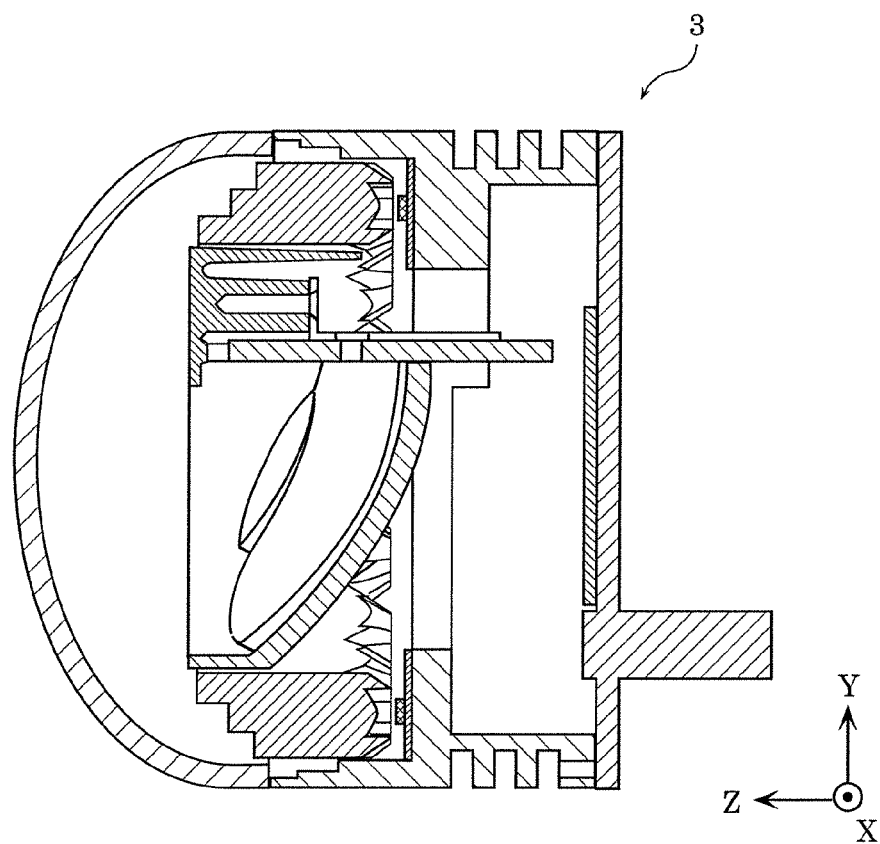
FIG. 2 is a cross-sectional view of a lighting apparatus according to the embodiment.

FIG. 2 is a cross-sectional view of the lighting apparatus according to this embodiment, taken along a plane that is parallel to plane YZ.

Figure 3:
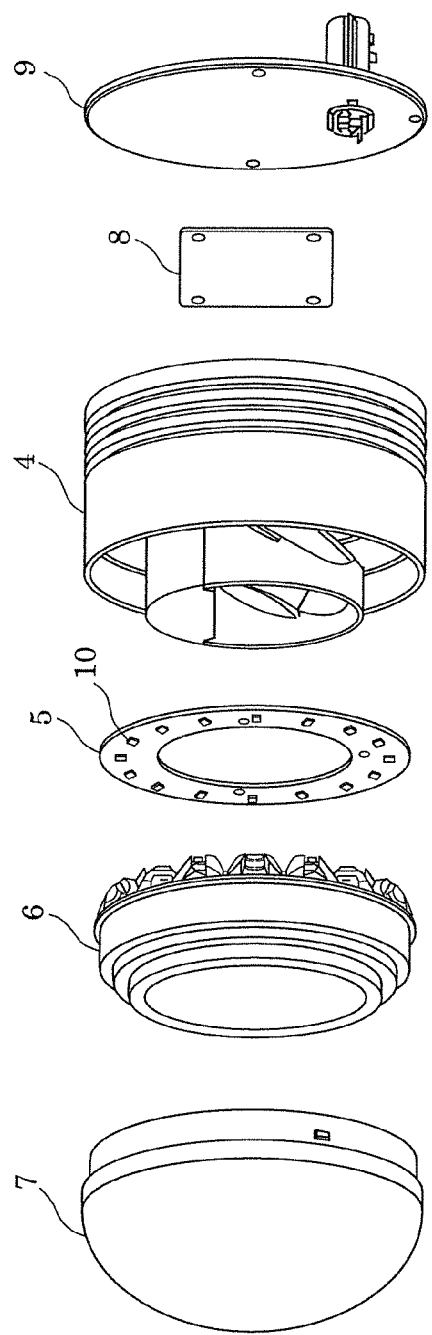
FIG. 3 is an exploded perspective view of the lighting apparatus according to the embodiment.

FIG. 3 is an exploded perspective view of the lighting apparatus according to this embodiment.

As illustrated in FIG. 1, lighting apparatuses 3 according to this embodiment are disposed at the left and right of a front face of automobile 1. Furthermore, aside from lighting apparatuses 3, the front face of automobile 1 also includes head lamps 2.

Head lamps 2 are lighting apparatuses that are mainly turned ON at night to illuminate in the forward direction (the positive direction on the Z-axis in FIG. 1).

Lighting apparatuses 3 in this embodiment are turned ON not only at night but also in the daytime in order to make the presence of automobile 1 known to oncoming vehicles and pedestrians.

As illustrated in FIG. 2 and FIG. 3, each of lighting apparatuses 3 includes case 4; board 5 and light-distributing component 6, which are mounted inside a forward (the positive direction on the Z-axis in FIG. 2)-side opening of case 4; and cover 7 that covers the forward-side opening. Lighting apparatus 3 further includes circuit 8 that is mounted inside a backward (the negative direction on the Z-axis in FIG. 2)-side opening of case 4; and back cover 9 that covers the backward-side opening.

Case 4 is a case that houses board 5 and light-distributing component 6 on the forward-side and circuit 8 on the backward-side. Case 4 is, for example, formed from a metal such as germanium, and also functions as a heat sink for releasing heat generated from board 5, circuit 8, etc. to the outside.

Board 5 has a ring-like shape and includes, on the forward-side, light-emitting devices 10 which are arranged in a ring at predetermined intervals. This embodiment shows an example in which 16 of light-emitting devices 10 are arranged on board 5.

Each of light-emitting devices 10 arranged on board 5 is a device that emits light forward. Light-emitting device 10 consists of, for example, a solid-state light-emitting device such as an LED.

Light-distributing component 6 is a ring-shaped optical element for collimating light outputted from light-emitting devices 10 on board 5, and emitting the collimated light forward. It should be noted that the term collimate is defined here as making light rays approach parallel. In other words, the definition of the term collimate is not limited to making light rays perfectly parallel.

Light-distributing component 6 is formed using a light-transmissive material, and is formed using a transparent resin material such as polymethyl methacrylate (PMMA) (acrylic) or polycarbonate, or a transparent material such as a glass material. Light-distributing component 6 will be described in detail later.

Cover 7 is a substantially hemispherical component that covers the forward-side opening of case 4. Cover 7 is formed using a light-transmissive material in order to allow transmission of light emitted from light-distributing component 6, and is formed using a transparent resin material such as PMMA (acrylic) or polycarbonate, or a transparent material such as a glass material.

Circuit 8 is an electrical circuit that is supplied with power from the outside and supplies light-emitting devices 10 with voltage and current suitable for light-emitting devices 10.

Back cover 9 is a disk-shaped component that covers the backward-side opening of case 4 and includes a terminal for supplying power from the outside of lighting apparatus 3 to the inside.

(Light-distributing Component)

Next, an outline of light-distributing component 6 of lighting apparatus 3 according to this embodiment will be described with reference to FIG. 4 to FIG. 7.

Figure 4:
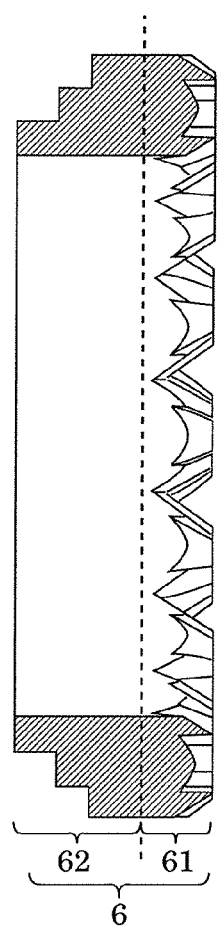
FIG. 4 is a cross-sectional view of a light-distributing component of the lighting apparatus according to the embodiment.

FIG. 4 is cross-sectional view of light-distributing component 6 of lighting apparatus 3 according to this embodiment.

Figure 5:
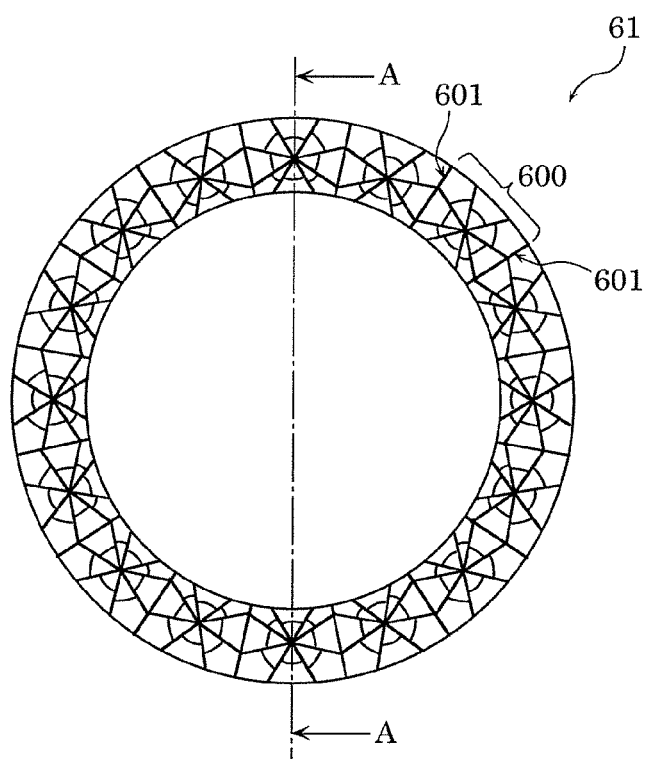
FIG. 5 is an external view of a light entry face of a light guide according to the embodiment.

FIG. 5 is an external view of the light entry face of light guide 61 according to this embodiment.

Figure 6:
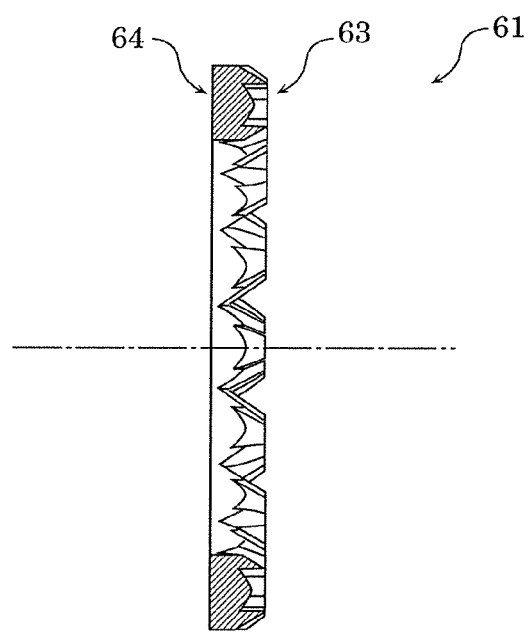
FIG. 6 is a cross-sectional view of the light guide according to the embodiment, at line A-A in FIG. 5.

FIG. 6 is a cross-sectional view of light guide 61 according to this embodiment, at line A-A in FIG. 5.

Figure 7:
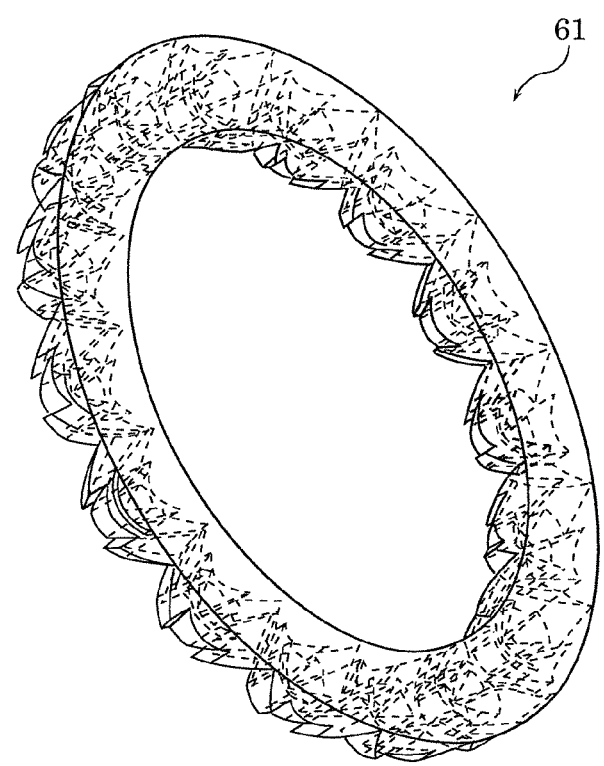
FIG. 7 is a perspective view of the light guide according to the embodiment.

FIG. 7 is a perspective view of light guide 61 according to this embodiment.

As illustrated in FIG. 4, light-distributing component 6 includes ring-shaped light guide 61 disposed on the light-emitting devices 10-side and light emitter 62 disposed on the side at which light exits. Although, in this embodiment, a stepped structure is formed in light emitter 62 to allow emitted light to be distributed in three directions, light emitter 62 is not limited to such structure. For example, a flat face may be formed on the side of light emitter 62 at which the light is emitted. It should be noted that light guide 61 and light emitter 62 may be integrally formed or may be formed as separate bodies.

Furthermore, as illustrated in FIG. 5 to FIG. 7, a structure for collimating incident light is formed in light guide 61. This structure is described in detail below.

As illustrated in FIG. 5, light guide 61 is configured by having plural collimating portions 600 connected in the circumferential direction of light guide 61 by connecting portions 601. In lighting apparatus 3 in this embodiment, an example configured from 16 collimating portions 600 is shown as an example of light guide 61. Each of the 16 collimating portions 600 is disposed at a position that corresponds to a different one of the 16 light-emitting devices 10 on board 5. In other words, collimating portions 600 and light-emitting devices 10 have a 1-to-1 correspondence. Each collimating portion 600 collimates the light emitted from light-emitting device 10 disposed at the opposing position. Collimating portions 600 will be described in detail later.

As illustrated in FIG. 6, light guide 61 includes light entry face 63 which is a face into which light from light-emitting devices 10 enters, and light exit face 64 which is a face from which the light exits. In light guide 61, light entering from light entry face 63 is collimated and the collimated light is emitted from light exit face 64.

Next, an outline of collimating portions 600 illustrated in FIG. 5 is described with reference to FIG. 8.

Figure 8:
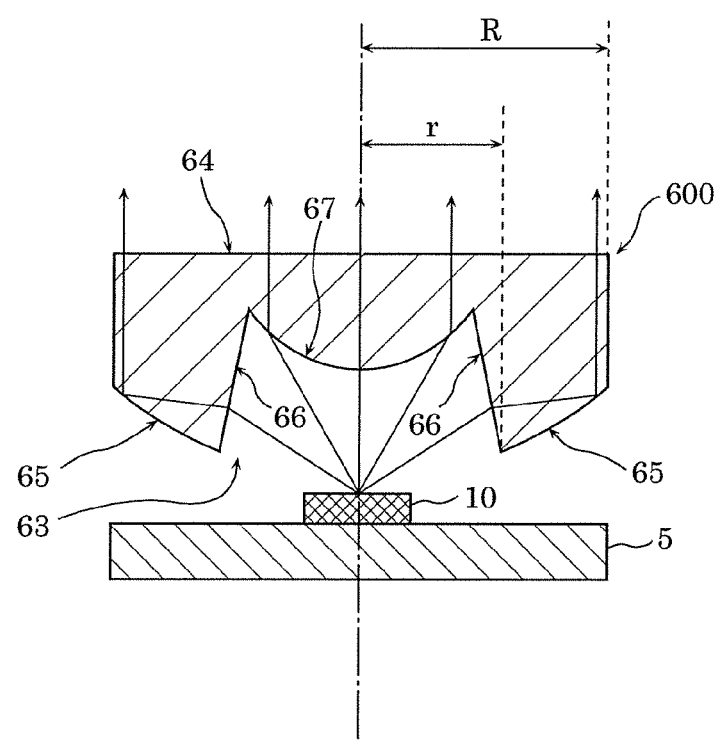
FIG. 8 is a cross-sectional view of a board and a collimating portion for describing a light collimating action of the collimating portion of the light guide according to the embodiment.

FIG. 8 is a cross-sectional view of board 5 and collimating portion 600 for describing the light collimating action of collimating portions 600 of light guide 61 according to this embodiment.

As illustrated in FIG. 8, collimating portion 600 includes, on the light-emitting device 10-side, light-refracting face 67, inner faces 66, and light-reflecting faces 65. The dot-dash line illustrated in FIG. 8 indicates the optical axis of collimating portion 600 and light-emitting device 10. Furthermore, arrows extending from light-emitting device 10 illustrated in FIG. 10 indicate the path of light emitted from light-emitting device 10. Although this embodiment shows an example in which the optical axis of collimating portion 600 and the optical axis of light-emitting device 10 coincide with each other, it is sufficient that these optical axes substantially coincide. The allowable range of displacement between these optical axes is determined as appropriate in accordance with the characteristics required of lighting apparatus 3. It should be noted that the optical axis of collimating portion 600 is a line which, at the apex of light-refracting face 67, is perpendicular to light-refracting face 67. Alternatively, the optical axis of light collimating portion 600 may be defined as the axis at which the amount of light emitted from collimating portion 600 in the optical axis direction is at maximum when the optical axis of light collimating portion 600 and the optical axis of light-emitting device 10 are made to coincide with each other.

Light-refracting face 67 is a convex face which refracts light emitted from light-emitting device 10 to collimate the light in the optical axis direction.

Each of inner faces 66 is a face that allows light emitted from light-emitting device 10 to pass. At least part of the light that has passed through inner face 66 is incident on light-reflecting faces 65.

Each of light-reflecting faces 65 is a reflecting face that reflects, in a direction close to the optical axis direction, the light from light-emitting device 10 that has passed through inner face 66. As illustrated in FIG. 8, each of light-reflecting faces 65 is a curved face extending from an end portion (the point that is a distance r from the optical axis in FIG. 8) on the light-emitting device 10-side (optical axis-side) to an end portion (the point that is a distance R from the optical axis in FIG. 8) on the light exit face 64-side. This curved face is configured in such a way that the radius of curvature in a plane including the optical axis decreases with the distance to light-emitting device 10. With this, the amount of light emitted in the optical axis direction from collimating portion 600 is further increased.

In this embodiment, collimating portion 600 includes plural light-reflecting faces 65 for which distances r from the light-emitting device 10-side (optical axis-side) end portions of respective light-reflecting faces 65 to the optical axis are different. Light-reflecting faces 65 will be described in detail later.

Next, the detailed shape of collimating portions 600 of light guide 61 according to this embodiment will be described with reference to FIG. 9 and FIG. 10.

Figure 9:
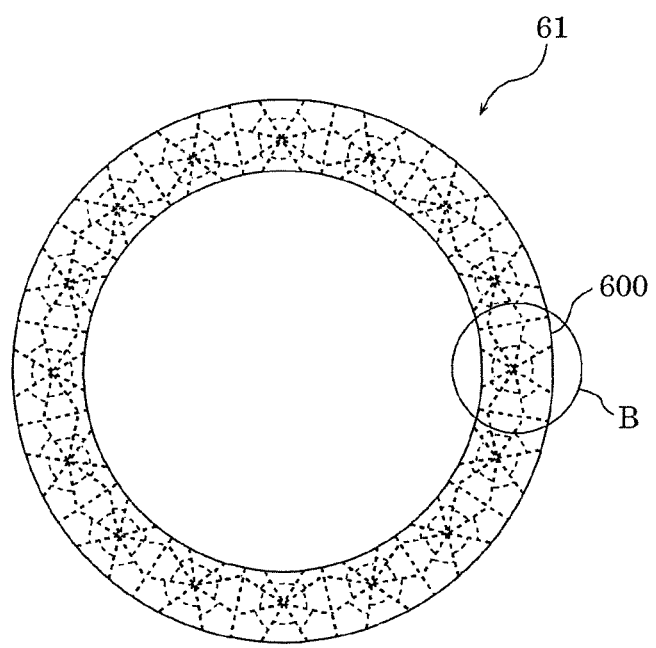
FIG. 9 is an external view of a light exit face-side of the light guide according to the embodiment.

FIG. 9 is an external view of the light exit face 64-side of light guide 61 according to this embodiment.

Figure 10:
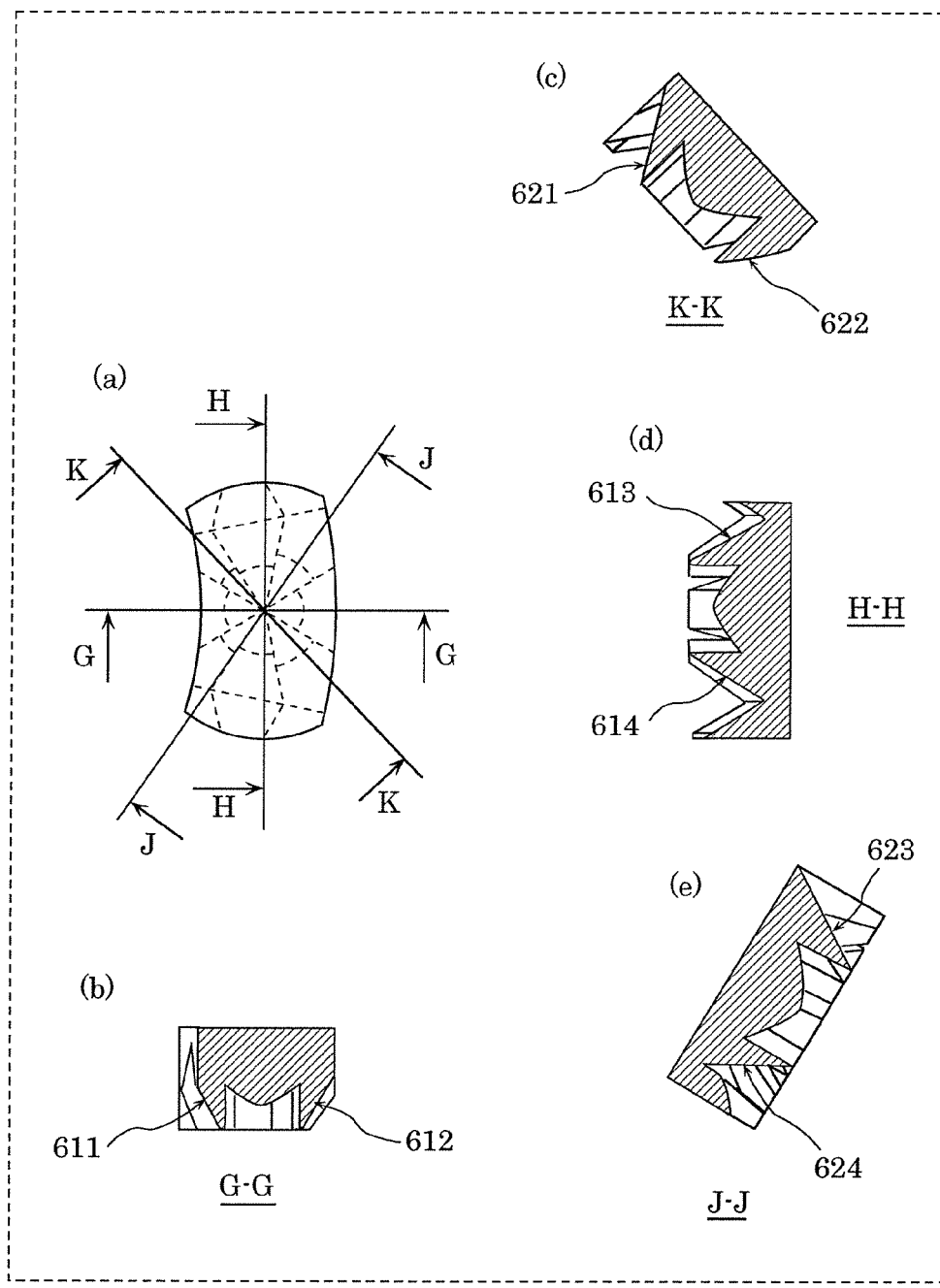
FIG. 10 is a diagram illustrating an enlarged view of portion B of the light guide illustrated in FIG. 9, and a G-G cross-sectional view, a K-K cross-sectional view, an H-H cross-sectional view, and a J-J cross-sectional view of the enlarged view.

FIG. 10 is a diagram illustrating an enlarged view (a) of portion B of light guide 61 illustrated in FIG. 9, and a G-G cross-sectional view (b), a K-K cross-sectional view (c), an H-H cross-sectional view (d), and a J-J cross-sectional view (e) of the enlarged view.

Portion B illustrated in FIG. 9 includes one collimating portion 600.

As illustrated in the respective cross-sectional views in FIG. 10, light-reflecting faces 65 of collimating portion 600 include inner reflecting face 611, outer reflecting face 612, lateral reflecting faces 613 and 614, and large radius reflecting faces 621, 622, 623, and 624.

As illustrated in G-G cross-sectional view (b) in FIG. 10, inner reflecting face 611 is a reflective face disposed on the inner circumference-side of light guide 61 with respect to the optical axis of collimating portion 600, and outer reflecting face 612 is a reflective face disposed in the outer circumference-side of light guide 61 with respect to the optical axis of collimating portion 600.

As illustrated in H-H cross-sectional view (d) in FIG. 10, lateral reflecting faces 613 and 614 are reflecting faces disposed in the circumferential direction of light guide 61, with respect to the optical axis of collimating portion 600.

As illustrated in K-K cross-sectional view (c) and J-J cross-sectional view (e) in FIG. 10, large radius reflecting faces 621 and 624 are reflecting faces disposed between inner reflecting face 611 and lateral reflecting face 613 and between inner reflecting face 611 and lateral reflecting face 614, respectively. Furthermore, large radius reflecting faces 622 and 623 are reflecting faces disposed between outer reflecting face 612 and lateral reflecting face 614 and between outer reflecting face 612 and lateral reflecting face 613, respectively. Here, the distances from the optical axis to the optical axis-side (the light-emitting device 10-side) end portions of large radius reflecting faces 621, 622, 623, and 624 are greater than the distances from the optical axis to the optical axis-side (the light-emitting device 10-side) end portions of inner reflecting face 611, outer reflecting face 612, and lateral reflecting faces 613 and 614.

The action, etc. of collimating portion 600 described above will be discussed with reference to FIG. 11 to FIG. 16.

Figure 11:
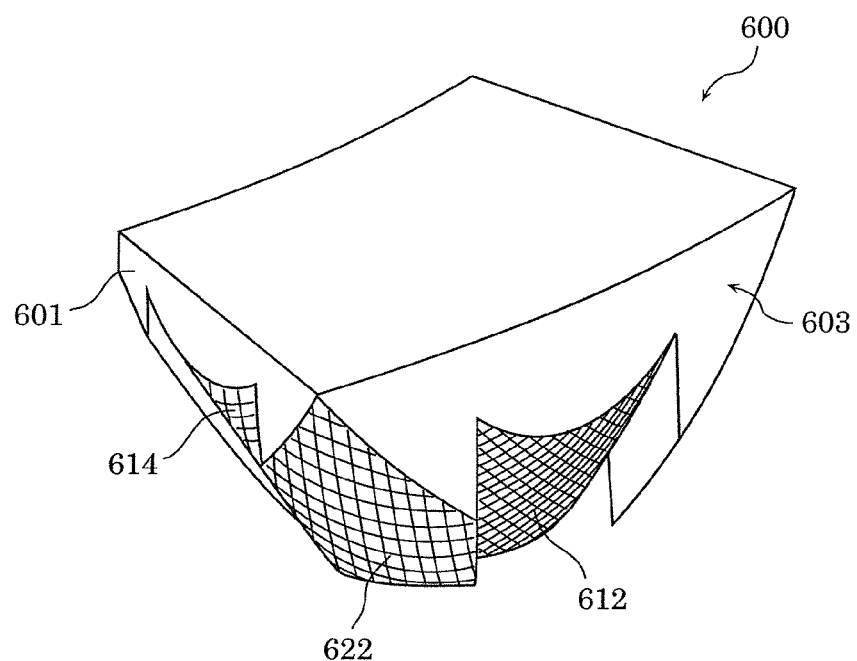
FIG. 11 is a perspective view of light-reflecting faces of the collimating portion according to the embodiment.

FIG. 11 is a perspective view of the light-reflecting faces of collimating portion 600 according to this embodiment.

Figure 12:
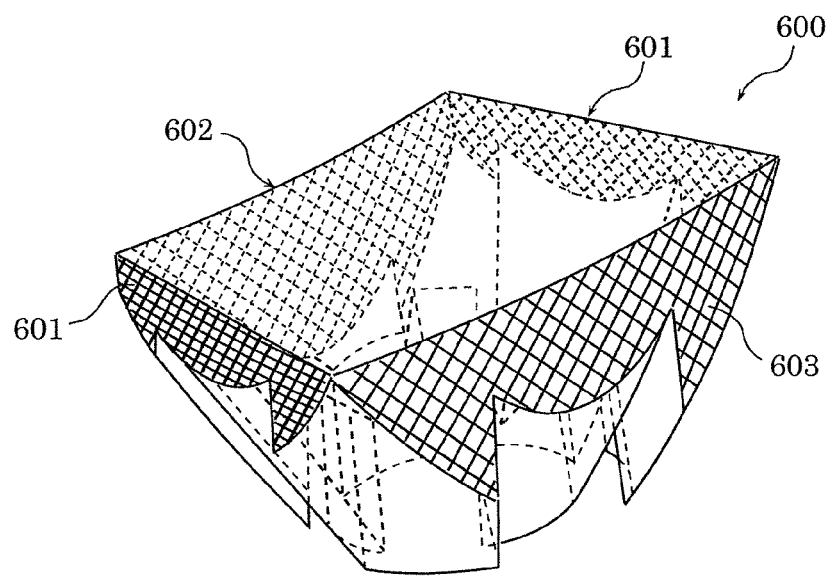
FIG. 12 is a perspective view of faces that do not contribute to collimation by the collimating portion according to the embodiment.

FIG. 12 is a perspective view of faces that do not contribute to the collimation by collimating portion 600 according to this embodiment.

Figure 13:
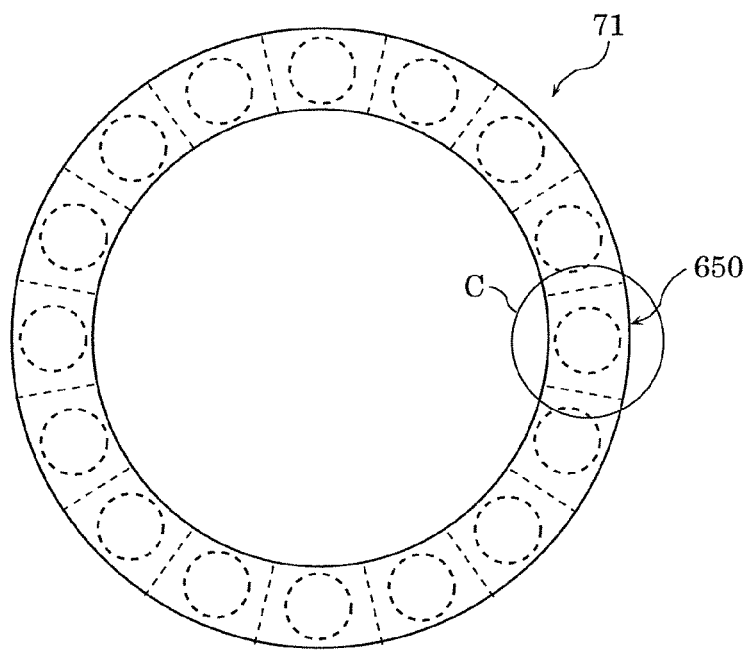
FIG. 13 is an external view of a light exit face-side of a light guide in a comparative example.

FIG. 13 is an external view of the light exit face-side of a light guide in a comparative example.

Figure 14:
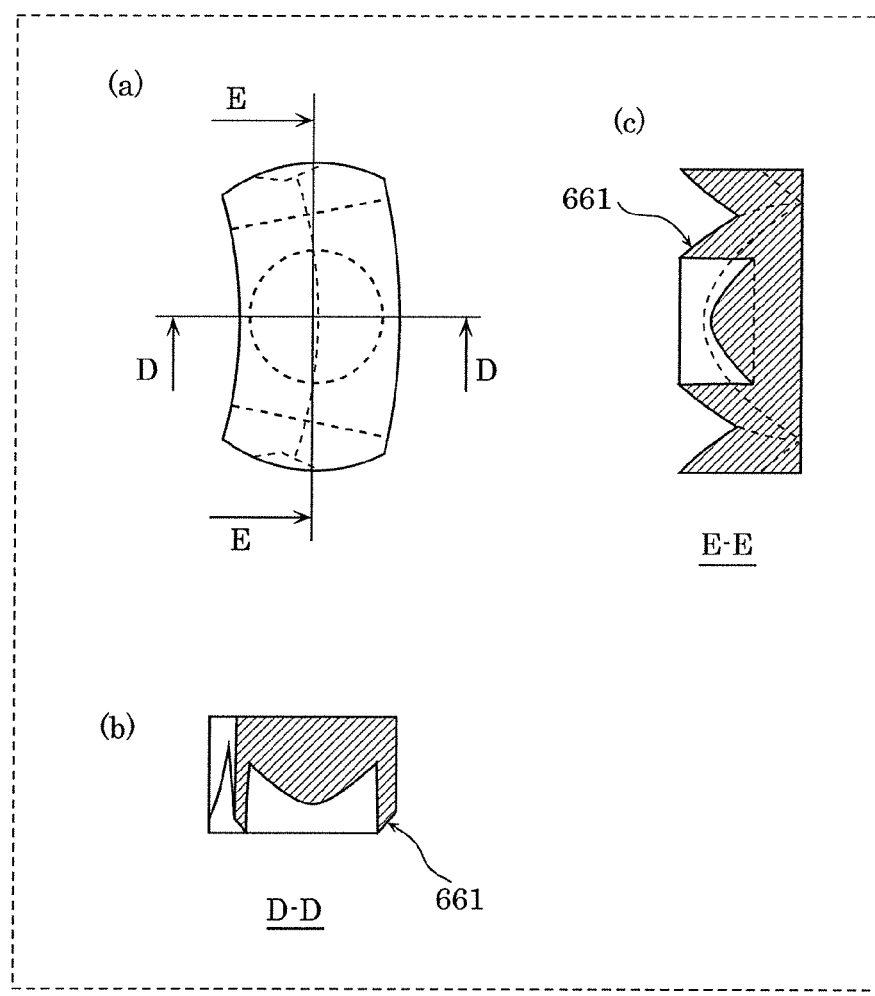
FIG. 14 is a diagram illustrating an enlarged view of portion C of the light guide illustrated in FIG. 13, and a D-D cross-sectional view and an E-E cross-sectional view of the enlarged view.

FIG. 14 is a diagram illustrating an enlarged view (a) of portion C of the light guide in FIG. 13, and D-D cross-sectional view (b) and E-E cross-sectional view (c) of the enlarged view.

Figure 15:
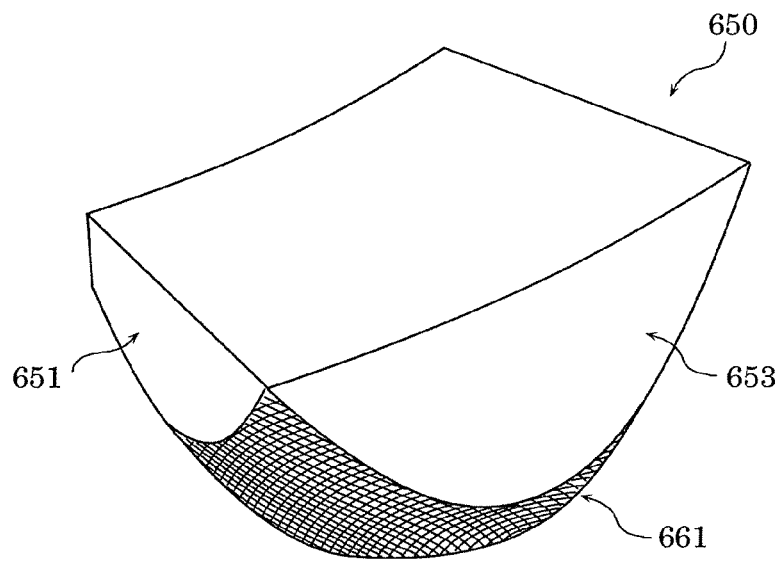
FIG. 15 is a perspective view of a light-reflecting face of a collimating portion in the comparative example.

FIG. 15 is a perspective view of the light-reflecting faces of a collimating portion in the comparative example.

Figure 16:
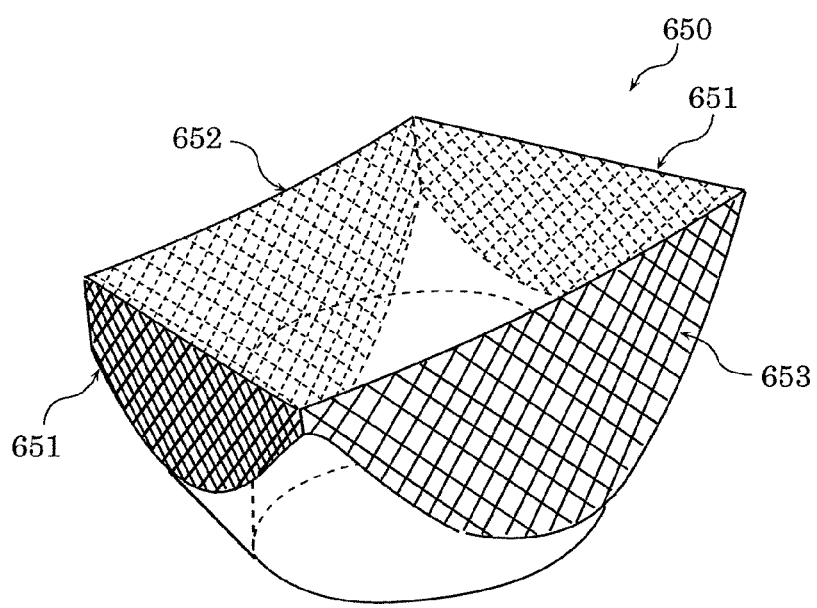
FIG. 16 is a perspective view of faces that do not contribute to collimation by the collimating portion in the comparative example.

FIG. 16 is a perspective view of faces that do not contribute to the collimation by the collimating portion in the comparative example.

Among the outer faces of collimating portion 600, lateral reflecting face 614, outer reflecting face 612, and large radius reflecting face 622 are shown with a hatching pattern in FIG. 11 in order to facilitate comparison with the comparative example in FIG. 15 described later. It should be noted that, in FIG. 11, connecting portion 601 and outer circumferential face 603, which are shown without the hatching pattern, are portions that do not contribute to collimation.

Furthermore, among the outer faces of collimating portion 600, connecting portions 601, inner circumferential face 602, and outer circumferential face 603, which do not contribute to collimation, are shown with a hatching pattern in FIG. 12 in order to facilitate comparison with the comparative example in FIG. 16 described later.

Light guide 71 in the comparative example illustrated in FIG. 13 is an example which is different from this embodiment in terms of the shape of the reflecting face of collimating portion 650, and is identical to this embodiment in terms of other elements. As illustrated in FIG. 13 and FIG. 14, in collimating portion 650 in the comparative example, the distance from the optical axis to the optical axis-side (lower-side in D-D cross-sectional view in FIG. 14) end portion of light-reflecting face 661 is uniform. It should be noted that, in the comparative example, this distance is approximately the same as the distance from the optical axis to the optical axis-side end portion of large radius reflecting face 621, etc. in this embodiment.

Among the outer faces of collimating portion 650, light-reflecting face 661 is shown with a hatching pattern in FIG. 15 in order to facilitate comparison with this embodiment in FIG. 11 described above. It should be noted that, in FIG. 15, connecting portions 651 and outer circumferential face 653, which are shown without the hatching pattern, are portions that do not contribute to collimation.

Furthermore, among the outer faces of collimating portion 650, connecting portions 651, inner circumferential face 652, and outer circumferential face 653, which do not contribute to collimation, are shown with a hatching pattern in FIG. 16 in order to facilitate comparison with this embodiment in FIG. 12 described above.

Comparing FIG. 11 and FIG. 15, it can be seen that the surface area of the reflecting face(s) contributing to collimation is larger for collimating portion 600 according to this embodiment than collimating portion 650 in the comparative example. Furthermore, comparing FIG. 12 and FIG. 16, it can be seen that the surface area of the faces that do not contribute to collimation is smaller for collimating portion 600 according to this embodiment than collimating portion 650 in the comparative example.

This is because, in collimating portion 600 according to this embodiment, for a reflecting face for which the distance from the optical axis to the light exit face 64-side end portion of the reflecting face is relatively short, the distance from the optical axis to the light-emitting device 10-side (optical axis-side) end portion is made shorter than that for the comparative example.

Furthermore, as illustrated in FIG. 10 to FIG. 12, in collimating portion 600, the light exit face 64-side end portions of outer reflecting face 612, inner reflecting face 611, and lateral reflecting faces 613 and 614 are disposed closer to the light-emitting device 10-side than the light exit face 64-side end portion of collimating portion 600 is. With this, the light exit face 64-side end portions of the respective reflecting faces do not reach light exit face 64. Therefore, since the cross sections of the light exit face 64-side end portions of the respective reflecting faces of collimating portion 600 do not form acute angles, damage to the light exit face 64-side end portions of the respective reflecting faces can be suppressed.

[Advantageous Effects, Etc.]

As described above, each of collimating portions 600 of light guide 61 according to this embodiment includes, as light-reflecting faces 65, outer reflecting face 612 and inner reflecting face 611 respectively disposed in the outer circumference-side and the inner circumference-side of light guide 61 with respect to the optical axis. Furthermore, collimating portion 600 further includes, as light-reflecting faces 65, lateral reflecting faces 613 and 614 which are disposed in the circumferential direction of light guide 61 with respect to the optical axis. Furthermore, collimating portion 600 further includes, as light-reflecting faces 65, large radius reflecting faces 621, 622, 623, and 624 which are disposed between inner reflecting face 611 and the respective lateral reflecting faces and between outer reflecting face 612 and the respective lateral reflecting faces. In addition, the distances from the optical axis to the respective optical axis-side end portions of outer reflecting face 612, inner reflecting face 611, and lateral reflecting faces 613 and 614 are less than the distances from optical axis to the optical axis-side end portions of large radius reflecting faces 621, 622, 623, and 624.

Accordingly, compared to collimating portion 650 in the comparative example, the surface area of the reflecting faces of collimating portion 600 according to this embodiment is larger and the surface area of faces not contributing to collimation is smaller. Therefore, collimating portion 600 according to this embodiment is capable of increasing the amount of light emitted forward (i.e., in the optical axis direction) more than collimating portion 650 in the comparative example. In other words, with lighting apparatus 3 according to this embodiment, visibility is improved by increasing the amount of light that is emitted forward.

In addition, with collimating portion 600 according to this embodiment, the surface area of light-reflecting faces 65, that is, the cross-section area of emitted light is increased, and thus the graininess (scattered brightness) of light emitted from light guide 61 can also be suppressed.

Furthermore, in collimating portion 600 according to this embodiment, outer reflecting face 612, inner reflecting face 611, lateral reflecting faces 613 and 614, and large radius reflecting faces 621, 622, 623, and 624 have curved faces. In addition, the curved faces have a radius of curvature in a plane including the optical axis which decreases with the distance to light-emitting device 10.

With this, the amount of light emitted in the optical axis direction from collimating portion 600 is further increased.

Furthermore, in collimating portion 600 according to this embodiment, the light exit face 64-side end portions of outer reflecting face 612, inner reflecting face 611, and lateral reflecting faces 613 and 614 are disposed closer to the light-emitting device 10-side than the light exit face 64-side end portion of collimating portion 600 is.

With this, the light exit face 64-side end portions of the respective reflecting faces do not reach light exit face 64. Therefore, since the cross sections of the light exit face 64-side end portions of the respective reflecting faces of collimating portion 600 do not form acute angles, damage to the light exit face 64-side end portions of the respective reflecting faces can be suppressed.

Furthermore, in light guide 61 according to this embodiment, two of collimating portions 600 that are adjacent in the circumferential direction of light guide 61 are connected by connecting portion 601, and lateral reflecting surfaces 613 and 614 are disposed closer to the light-emitting device 10-side than connecting portion 601 is.

Accordingly, adjacent collimating portions 600 can be integrally formed, and light guide 61 as a whole is capable of emitting a connected light.

Furthermore, in an automobile that includes lighting apparatus 3 according to this embodiment on the front face of the body of the automobile, visibility from oncoming vehicles, pedestrians, etc. is improved by increasing the amount of light emitted forward from lighting apparatus 3.

(Variations, etc.)

Although the lighting apparatus according to an aspect of the present invention has been discussed thus far based on an exemplary embodiment, the present invention is not limited to the exemplary embodiment.

For example, in the above-described embodiment, the distances from the optical axis to the optical axis-side end portions of inner reflecting face 611, outer reflecting face 612, and lateral reflecting faces 613 and 614 are all less than the distances from the optical axis to the optical axis-side end portions of large radius reflecting portions 621, 622, 623, and 624. However, the present invention is not limited to such configuration. For example, it is sufficient that the distance from the optical axis to the optical axis-side end portion of at least one of inner reflecting face 611, outer reflecting face 612, and lateral reflecting faces 613 and 614 be less than the distances from the optical axis to the optical axis-side (light-emitting device 10-side) end portions of large radius reflecting faces 621, 622, 623, and 624.

Furthermore, although the above-described embodiment uses a configuration including eight reflecting faces as the configuration of light-reflecting faces 65 of collimating portion 600, the present invention is not limited to such configuration. For example, a configuration including even more reflecting faces may be used.

Furthermore, although the above-described embodiment uses a configuration in which the respective reflecting faces of collimating portion 600 have curved faces, and the curved faces have a radius of curvature in a plane including the optical axis which decreases with the distance to light-emitting device 10, the present invention is not limited to such configuration. For example, a configuration in which at least one of the aforementioned respective reflective faces is such a curved face may be used.

Furthermore, although the above-described embodiment shows an example in which lighting apparatuses 3 are disposed on the front face of automobile 1, the use of lighting apparatus 3 is not limited to such. For example, light apparatus 3 may be applied to traffic lights, etc.

Aside from the above, forms obtained by various modifications to the exemplary embodiment that can be conceived by a person of skill in the art as well as forms realized by arbitrarily combining structural components and functions in the exemplary embodiment and variations thereof which are within the scope of the essence of the present invention are included in the present invention.

While the above-described has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting apparatus comprising:
a light guide having a ring-like shape and including a light entry face and a light exit face each having a ring-like shape; and
a plurality of light-emitting devices arranged in a ring at predetermined intervals, at positions opposite the light entry face,
wherein the light guide includes a plurality of collimating portions that collimate light emitted from the plurality of light-emitting devices,
each of the plurality of collimating portions includes a light-refracting face and a plurality of light-reflecting faces, that collimate, in a direction of an optical axis of the collimating portion, light emitted obliquely with respect to the optical axis, from a corresponding one of the plurality of light-emitting devices,
the light-refracting face is disposed opposite the corresponding one of the plurality of light-emitting devices, and collimates the light emitted from the corresponding one of the plurality of light-emitting devices by refracting the light,
the plurality of light-reflecting faces receive the light emitted from the corresponding one of the plurality of light-emitting devices that is not received by the light-refracting face, and include:
an outer reflecting face disposed on an outer circumference-side of the light guide with respect to the optical axis;
an inner reflecting face disposed on an inner circumference-side of the light guide with respect to the optical axis;
a lateral reflecting face disposed in a circumferential direction of the light guide with respect to the optical axis; and
a large radius reflecting face disposed in each of a position between the inner reflecting face and the lateral reflecting face and a position between the outer reflecting face and the lateral reflecting face, and
a distance from the optical axis to an optical axis-side end portion of at least one of the outer reflecting face, the inner reflecting face, and the lateral reflecting face is less than a distance from the optical axis to an optical axis-side end portion of the large radius reflecting face.

2. The lighting apparatus according to claim 1,
wherein at least one of the outer reflecting face, the inner reflecting face, the lateral reflecting face, and the large radius reflecting face has a curved face having a radius of curvature in a plane including the optical axis which decreases with a distance to the corresponding one of the plurality of light-emitting devices.

3. The lighting apparatus according to claim 1,
wherein a light exit face-side end portion of each of the outer reflecting face, the inner reflecting face, and the lateral reflecting face is disposed closer to a light-emitting device-side than a light exit face-side end portion of the light guide is.

4. The lighting apparatus according to claim 1,
wherein two of the plurality of collimating portions which are adjacent in the circumferential direction of the light guide are connected by a connecting portion, and
the lateral reflecting face is disposed closer to a light-emitting device-side than the connecting portion is.

5. An automobile comprising the lighting apparatus according to claim 1, the lighting apparatus being disposed on a front face of a body of the automobile.

6. The lighting apparatus according to claim 1, wherein each of the plurality of collimating portions collimate light emitted from the corresponding one of the plurality of light emitting devices without diverting the light from a symmetrical arrangement of the light about the optical axis.

7. The lighting apparatus according to claim 1, wherein light received and refracted by the light refracting face of the collimating portion is emitted from the light guide without being reflected by the plurality of light reflecting faces.

8. The lighting apparatus according to claim 1, wherein, for each of the plurality of light emitting devices, the plurality of light reflecting faces of the collimating portion is symmetrically positioned about the light refracting face of the collimating portion.

* * * * *